United States Patent
McCay et al.

(10) Patent No.: US 6,173,886 B1
(45) Date of Patent: Jan. 16, 2001

(54) METHOD FOR JOINING DISSIMILAR METALS OR ALLOYS

(75) Inventors: Mary Helen McCay; T. Dwayne McCay, both of Monteagle; Narendra B. Dahotre; John A. Hopkins, both of Tullahoma; Frederick A. Schwartz, Woodbury; John Brice Bible, South Pittsburg, all of TN (US)

(73) Assignee: The University of Tennessee Research Corportion, Knoxville, TN (US)

( * ) Notice: Under 35 U.S.C. 154(b), the term of this patent shall be extended for 0 days.

(21) Appl. No.: 09/317,295

(22) Filed: May 24, 1999

(51) Int. Cl.[7] .............................. B23K 20/00; B23K 9/04
(52) U.S. Cl. ...................... 228/194; 228/121; 228/121.1; 219/76.1; 219/121.64; 219/121.85
(58) Field of Search ..................................... 228/194, 193, 228/121.1, 120; 219/121.63, 121.64, 121.85, 76.12, 118, 76.1; 427/556, 597

(56) References Cited

U.S. PATENT DOCUMENTS

| | | |
|---|---|---|
| 3,705,758 | 12/1972 | Haskal . |
| 3,848,104 | 11/1974 | Locke . |
| 3,986,767 | 10/1976 | Rexer et al. . |
| 4,015,100 | 3/1977 | Gnanamuthu et al. . |
| 4,017,708 | 4/1977 | Engel et al. . |
| 4,023,936 * | 5/1977 | Morse et al. .......................... 428/679 |
| 4,033,504 * | 7/1977 | Fletcher et al. ...................... 228/190 |
| 4,157,923 | 6/1979 | Yen et al. . |
| 4,212,900 | 7/1980 | Serlin . |
| 4,322,601 | 3/1982 | Serlin . |
| 4,434,189 | 2/1984 | Zaplatynsky . |
| 4,475,027 | 10/1984 | Pressley . |
| 4,480,169 | 10/1984 | Macken . |
| 4,495,255 | 1/1985 | Draper et al. . |
| 4,514,470 * | 4/1985 | Rosenthal et al. ................... 428/662 |

(List continued on next page.)

FOREIGN PATENT DOCUMENTS

| | | |
|---|---|---|
| 4126351 | 2/1993 | (DE) . |
| 876870A1 | 4/1998 | (EP) . |
| 279692 | 11/1988 | (JP) . |
| 401083676 | 3/1989 | (JP) . |
| 381082 | 4/1991 | (JP) . |
| 3115587 | 5/1991 | (JP) . |
| 403115531 | 5/1991 | (JP) . |
| 5285686 | 11/1993 | (JP) . |
| 1557193 | 4/1990 | (SU) . |
| 1743770 | 6/1992 | (SU) . |
| WO 95/21720 | 8/1995 | (WO) . |
| WO 97/47397 | 12/1997 | (WO) . |

OTHER PUBLICATIONS

Ernest Nippes. Metals Handbook: Ninth edition; vol. 6 Welding, Brazing, and Soldering, p. 709–711, 689–690, 680–681, 672–678, 655–658, 708, 684.*

ASM Handbook, vol. 6, Welding, Brazing, and Soldering, 1993.

Ayers, et al.; "A Laser Processing Technique for Improving the Wear Resistance of Metals," *Journal of Metals*, Aug. 1981, 19–23.

Belvaux, et al.; "A Method for Obtaining a Uniform Non–Gaussian Laser Illumination," *Optics Communications*, vol. 15, No. 2, Oct. 1975, 193–195.

Bett, et al.; "Binary phase zone–plate arrays for laser–beam spatial–intensity distribution conversion," *Applied Optics*, vol. 34, No. 20, Jul. 10, 1995, 4025–4036.

(List continued on next page.)

Primary Examiner—Patrick Ryan
Assistant Examiner—Jonathan Johnson
(74) Attorney, Agent, or Firm—Duane, Morris & Heckscher LLP

(57) ABSTRACT

The present invention relates to an improved method for joining metals or alloys together. Specifically, the present invention relates to a method comprising the laser alloying of a first metal/alloy piece so that it can be joined with a second metal/alloy piece of a nonidentical composition.

22 Claims, 5 Drawing Sheets

U.S. PATENT DOCUMENTS

| | | |
|---|---|---|
| 4,535,218 | 8/1985 | Krause et al. . |
| 4,617,070 | 10/1986 | Amende et al. . |
| 4,638,163 | 1/1987 | Braunlich et al. . |
| 4,644,127 | 2/1987 | La Rocca . |
| 4,702,969 * | 10/1987 | Bunkoczy et al. .................... 428/635 |
| 4,720,312 | 1/1988 | Fukuizumi et al. . |
| 4,724,299 | 2/1988 | Hammeke . |
| 4,746,540 | 5/1988 | Kawasaki et al. . |
| 4,750,947 | 6/1988 | Yoshiwara et al. . |
| 4,801,352 | 1/1989 | Piwczyk . |
| 4,839,518 | 6/1989 | Bruanlich et al. . |
| 4,847,112 | 7/1989 | Halleux . |
| 4,898,650 | 2/1990 | Wu et al. . |
| 4,904,498 | 2/1990 | Wu . |
| 4,964,967 | 10/1990 | Hashimoto et al. . |
| 4,981,716 | 1/1991 | Sundstrom . |
| 4,998,005 | 3/1991 | Rathi et al. . |
| 5,059,013 | 10/1991 | Jain . |
| 5,095,386 | 3/1992 | Scheibengraber . |
| 5,124,993 | 6/1992 | Braunlich et al. . |
| 5,130,172 | 7/1992 | Hicks et al. . |
| 5,147,999 | 9/1992 | Dekumbis et al. . |
| 5,196,672 | 3/1993 | Matsuyama et al. . |
| 5,208,431 | 5/1993 | Uchiyama et al. . |
| 5,230,755 | 7/1993 | Pierantoni et al. . |
| 5,247,155 | 9/1993 | Steen et al. . |
| 5,257,274 | 10/1993 | Barrett et al. . |
| 5,265,114 | 11/1993 | Sun et al. . |
| 5,267,013 | 11/1993 | Spence . |
| 5,290,368 | 3/1994 | Gavigan et al. . |
| 5,308,431 | 5/1994 | Maher et al. . |
| 5,314,003 | 5/1994 | Mackay . |
| 5,319,195 | 6/1994 | Jones et al. . |
| 5,322,436 | 6/1994 | Horng et al. . |
| 5,331,466 | 7/1994 | Van Saarloos . |
| 5,352,538 | 10/1994 | Takeda et al. . |
| 5,387,292 | 2/1995 | Morishige et al. . |
| 5,406,042 | 4/1995 | Engelfriet et al. . |
| 5,409,741 | 4/1995 | Laude . |
| 5,411,770 | 5/1995 | Tsai et al. . |
| 5,430,270 | 7/1995 | Findlan et al. . |
| 5,446,258 | 8/1995 | Mordike . |
| 5,449,536 | 9/1995 | Funkhouser et al. . |
| 5,466,906 | 11/1995 | McCune, Jr. et al. . |
| 5,484,980 | 1/1996 | Pratt et al. . |
| 5,486,677 | 1/1996 | Maischner et al. . |
| 5,491,317 | 2/1996 | Pirl . |
| 5,514,849 | 5/1996 | Findlan et al. . |
| 5,530,221 | 6/1996 | Benda et al. . |
| 5,546,214 | 8/1996 | Black et al. . |
| 5,563,095 | 10/1996 | Frey . |
| 5,614,114 | 3/1997 | Owen . |
| 5,643,641 | 7/1997 | Turchan et al. . |
| 5,648,176 * | 7/1997 | Nakagawa et al. .................. 428/593 |
| 5,659,479 | 8/1997 | Duley et al. . |
| 5,874,011 | 2/1999 | Ehrlich . |
| 5,985,056 * | 11/1999 | McCay et al. ........................ 148/511 |

OTHER PUBLICATIONS

Bewsher, et al.; "Design of single–element laser–beam shape projectors," Applied Optics, vol. 35, No. 10, Apr. 1, 1996, 1654–1658.

Breinan, et al.; "Processing material with lasers," Physics Today, Nov. 1976, 44–50.

Bruno, et al.; "Laserbeam Shaping for Maximum Uniformity and Maximum Loss, A Novel Mirror Arrangement Folds the Lobes of a Multimode Laserbeam Back onto its Center," Lasers & Applications, Apr. 1987, 91–94.

Chen, et al.; "The Use of a Kaleidoscope to Obtain Uniform Flux Over a Large Area in a Solar or Arc Imaging Furnace," Applied Optics, vol. 2, No. 3, Mar. 1963, 265–571.

Christodoulou, et al.; "Laser surface melting of some alloy steels," Metals Technology, Jun. 1983, vol. 10, 215–222.

Cullis, et al.; "A device for laser beam diffusion and homogenisation," J. Phys.E:Sci. Instrum., vol. 12, 1979, 668–689.

Dahotre, et al., "Development of microstructure in laser surface alloying of steel with chromium," Journal of Materials Science, vol. 25, 1990, 445–454.

Dahotre, et al., "Laser Surface Melting and Alloying of Steel with Chromium," Laser Material Processing III, 1989, 3–19.

Fernelius, et al.; "Design and Testing of a Refractive Laser Beam Homogenizer," Airforce Writing Aeronautical Laboratories Report, (AFWAL–TR–84–4042), Sep. 1984, 46 pages.

Frieden; "Lossless Conversion of a Plane Laser Wave to a Plane Wave of Uniform Irradiance," Applied Optics, vol. 4, No. 11, Nov. 1965, 1400–1403.

Galletti, et al.; "Transverse–mode selection in apertured super–Gaussian resonators: an experimental and numerical investigation for a pulsed $CO_2$ Doppler lidar transmitter," Applied Optics, vol. 36, No. 6, Feb. 20, 1997, 1269–1277.

Gori, et al.; "Shape–invariance range of a light beam," Optics Letters, vol. 21, No. 16, Aug. 15, 1996, 1205–1207.

Grojean, et al.; "Production of flat top beam profiles for high energy lasers," Rev. Sci. Instrum. 51(3), Mar. 1980, 375–376.

Hella, "Material Processing with High Power Lasers," Optical Engineering, vol. 17, No. 3, May–Jun. 1978, 198–201.

Ignatiev, et al.; "Real–time pyrometry in laser machining," Measurement and Science Technology, vol. 5, No. 5, 563–573.

"Laser Removing of Lead–Based Paint" Illinois Department of Transportation, Jun. 1992, 26 pages.

Jones, et al.; "Laser–beam analysis pinpoints critical parameters," Laser Focus World, Jan. 1993, 123–130.

Khanna, et al.; "The Effect of Stainless Steel Plasma Coating and Laser Treatment on the Oxidation Resistance of Mild Steel," Corrosion Science, vol. 33, No. 6, 1992, 949–958.

"New Products" Laser Focus World, Aug. 1996, 173.

Lugscheider, et al.;"A Comparison of the Properties of Coatings Produced by Laser Cladding and Conventional Methods," Surface Modification Technologies V, The Institute of Materials, 1992, 383–400.

Manna, et al.; "A One–dimensional Heat Transfer Model for Laser Surface Alloying of Chromium on Copper Substrate," Department of Metallurgical & Materials Engineering, Indian Institute of Technology, vol. 86, N. 5, May 1995, 362–364.

Mazille, et al.; "Surface Alloying of Mild Steel by Laser Melting of Nickel and Nickel/Chromium Precoatings," Materials Performance Maintenance, Aug. 1991, 71–83.

Molian; "Characterization of Fusion Zone Defects in Laser Surface Alloying Applications," Scripta Metallurgica, vol. 17, 1983, 1311–1314.

Molian; "Effect of Fusion Zone Shape on the Composition Uniformity of Laser Surface Alloyed Iron," Scripta Metallurgica, vol. 16, 1982, 65–68.

Molian; Structure and hardness of laser–processed Fe–0.2%C–5%Cr and Fe–0.2%C–10%Cr alloys; Journal of Materials Science, vol. 20, 1985, 2903–2912.

"Line–Focussing Optics for Multiple–Pass Laser Welding," NASA Tech Briefs MFS–29976, date unknown.

"Cylindrical Lenses," *Newport Technical Guide*, date unknown, N–65.

"Fused Silica Cylindrical Lenses," *Newport Technical Guide,*, date unknown, N–68.

Oswald, et al.; "Measurement and modeling of primary beam shape in an ion microprobe mass analyser," IOP Publishing Ltd., 1990, 255–259.

Renaud, et al., "Surface Alloying of Mild Steel by Laser Melting of an Electroless Nickel Deposit Containing Chromium Carbides," *Materials & Manufacturing Processes*, 6(2), 1991, 315–330.

Smurov, et al.; "Peculiarities of pulse laser alloying: Influence of spatial distribution of the beam," J. Appl. Phys. 71(7), Apr. 1, 1992, 3147–3158.

"Spawr Integrator," Spawr Optical Research, Inc., Data Sheet No. 512, Jun. 1986.

Veldkamp, et al.; "Beam profile shaping for laser radars that use detector arrays," *Applied Optics*, vol. 21, No. 2, Jan. 15, 1982, 345–358.

Veldkamp; "Laser Beam Profile Shaping with Binary Diffraction Gratings," *Optics communications*, vol. 38, No. 5,6, Sep. 1, 1981, 381–386.

Veldkamp; "Laser beam profile shpaing with interlaced binary diffraction gratings," *Applied Optics*, vol. 21, No. 17, Sep. 1, 1982, 3209–3212.

Veldkamp; "Technique for generating focal–plane flattop laser–beam profiles," Rev. Sci. Instru., vol. 53, No. 3, Mar. 1982, 294–297.

Walker, et al.; "Laser surface alloying of iron and 1C–1•4Cr steel with carbon," *Metals Technology*, vol. 11, Sep. 1984, 5 pages.

Walker, et al.; "The laser surface–alloying of iron with carbon," Journal of Material Science vol. 20, 1985, 989–995.

Wei, et al.; "Investigation of High–Intensity Beam Characteristics on Welding Cavity Shape and Temperature Distribution," Journal of Heat Transfer, vol. 112, Feb. 1990, 163–169.

Charschan, "Lasers in industry," *Laser Processing Fundamentals*, (Van Nostrand Reinhold Company), Chapter 3, Sec. 3–1, 139–145.

Fernelius, et al; "Calculations Used in the Design of a Refractive Laser Beam Homogenizer," *Airforce Writing Aeronautical Laboratories Report*, (AFWAL–TR–84–4047), Aug. 1984, 18 pages.

Jain, et al.; "Laser Induced Surface Alloy Formation and Diffusion of Antimony in Aluminum," *Nuclear Instruments and Method*, vol. 168, 275–282, 1980.

Molian; "Estimation of cooling rates in laser surface alloying processes," Journal of Materials Science Letters, vol. 4, 1985, 265–267.

"High Power CW Nd:YAG Laser Transformation Hardening," Hobart Laser Products, 2 pages.

* cited by examiner

```
┌──────────────────────────────────────────────────┐
│ COATING A FIRST SURFACE OF A FIRST               │
│ METAL OR ALLOY PIECE WITH A PRECURSOR            │
│ LAYER COMPRISING A BINDER AND                    │
│ ELEMENTAL/CERAMIC POWDER;                        │
└──────────────────────────────────────────────────┘
10

↓

┌──────────────────────────────────────────────────┐
│ IRRADIATING THE FIRST SURFACE OF THE             │
│ FIRST PIECE WITH A LASER BEAM AT A               │
│ SUFFICIENT ENERGY AND FOR A SUFFICIENT           │
│ TIME TO PRODUCE A SURFACE ALLOY LAYER            │
│ ON THE SAID FIRST PIECE;                         │
└──────────────────────────────────────────────────┘
12

↓

┌──────────────────────────────────────────────────┐
│ DIRECTING A SHIELDING GAS AT THE REGION          │
│ OF THE SURFACE BEING IRRADIATED;                 │
└──────────────────────────────────────────────────┘
14

↓

┌──────────────────────────────────────────────────┐
│ ALLOWING THE ALLOY LAYER TO SOLIDIFY;            │
│ AND                                              │
└──────────────────────────────────────────────────┘
16

↓

┌──────────────────────────────────────────────────┐
│ DIFFUSION BONDING/JOINING A SECOND               │
│ METAL OR ALLOY PIECE TO THE SURFACE              │
│ ALLOY LAYER OF THE FIRST PIECE, WHEREIN          │
│ THE SECOND PIECE HAS A COMPOSITION               │
│ THAT IS NOT IDENTICAL TO THAT OF THE             │
│ FIRST PIECE.                                     │
└──────────────────────────────────────────────────┘
18
```

*Figure 1*

| Step | Description |
|---|---|
| 20 | COATING A FIRST SURFACE OF A FIRST METAL OR ALLOY PIECE WITH A PRECURSOR LAYER COMPRISING A BINDER AND ELEMENTAL/CERAMIC POWDER; |
| 21 | IRRADIATING THE FIRST SURFACE OF THE FIRST PIECE WITH A LASER BEAM AT A SUFFICIENT ENERGY AND FOR A SUFFICIENT TIME TO PRODUCE A SURFACE ALLOY LAYER ON THE SAID FIRST PIECE; |
| 22 | ALLOWING THE ALLOY LAYER TO SOLIDIFY; |
| 23 | FLATTENING THE FIRST SURFACE OF SAID FIRST PIECE; |
| 24 | FLATTENING A FIRST SURFACE OF A SECOND METAL OR ALLOY PIECE WHEREIN THE SECOND PIECE HAS A COMPOSITION THAT IS NOT IDENTICAL TO THAT OF THE FIRST PIECE; |
| 25 | CLEANING THE FIRST SURFACE OF THE FIRST PIECE AND THE FIRST SURFACE OF A SECOND PIECE; AND |
| 26 | DIFFUSION BONDING/JOINING A SECOND METAL OR ALLOY PIECE TO THE SURFACE ALLOY LAYER OF THE FIRST PIECE. |

*Figure 2*

50 COATING A FIRST SURFACE OF A FIRST METAL OR ALLOY PIECE WITH A PRECURSOR LAYER COMPRISING A BINDER AND ELEMENTAL/CERAMIC POWDER;

52 IRRADIATING THE FIRST SURFACE OF THE FIRST PIECE WITH A LASER BEAM AT A SUFFICIENT ENERGY AND FOR A SUFFICIENT TIME TO PRODUCE A SURFACE ALLOY LAYER ON THE SAID FIRST PIECE;

54 ALLOWING THE ALLOY LAYER TO SOLIDIFY;

56 CLEANING THE FIRST SURFACE OF SAID FIRST PIECE AND THE FIRST SURFACE OF A SECOND PIECE; AND

58 JOINING THE FIRST SURFACE OF THE SECOND METAL OR ALLOY PIECE TO THE SURFACE ALLOY LAYER OF THE FIRST PIECE, WHEREIN THE SECOND PIECE HAS A COMPOSITION THAT IS NOT IDENTICAL TO THAT OF THE FIRST PIECE, SAID JOINING PERFORMED BY WELDING OR CLADDING.

*Figure 5*

METHOD FOR JOINING DISSIMILAR METALS OR ALLOYS

BACKGROUND OF THE INVENTION

1. Field of the Invention

The present invention relates to an improved method for joining metals or alloys together. Specifically, the present invention relates to a method comprising the laser alloying of a first metal/alloy piece so that it can be joined with a second metal/alloy piece of a nonidentical composition.

2. Description of the Prior Art

It is well known in the science of corrosion chemistry that certain metals and/or alloys will corrode if they are joined together. This corrosion results in a deterioration of the joint where the two metals or alloys are joined.

SUMMARY OF THE INVENTION

The present invention is directed to a method for joining two dissimilar metals or alloy pieces. The invention comprises coating a first surface of a first metal or alloy piece with a precursor layer comprising a binder and elemental/ceramic powder. The invention further comprises irradiating the first surface of the first piece with a laser beam at a sufficient energy and for a sufficient time to produce a surface alloyed layer on the first piece. The invention further comprises allowing the alloyed layer to solidify. The invention further comprises joining a second metal or alloyed piece to the surface alloyed layer of the first piece, wherein the second piece has a composition that is not identical to that of the first piece.

DESCRIPTION OF THE DRAWINGS

FIG. 1 is a block diagram of a first method of the present invention.

FIG. 2 is a block diagram of a second method of the present invention.

FIG. 5 is a block diagram of a third method of the present invention.

DESCRIPTION OF THE PREFERRED EMBODIMENTS

A first method of the present invention is directed toward joining two dissimilar metal or alloy pieces, as shown in FIG. 1. This method comprises coating a first surface 32 of a first metal or alloy piece 30 with a precursor layer, comprising a binder and elemental/ceramic powder, as shown in Block 10 of FIG. 1. In one preferred embodiment, the first piece comprises steel and the precursor comprises chromium. In this embodiment, the second piece may comprise aluminum, and the joining may be accomplished by diffusion bonding.

In another embodiment, the first piece comprises titanium-6 aluminum-4 vanadium and the precursor comprises chromium. In another embodiment, the first piece comprises aluminum or an aluminum alloy and the precursor comprises chromium or nickel.

The invention further comprises irradiating the first surface 32 of the first piece 30 with a laser beam at a sufficient energy and for a sufficient time to produce a surface alloy layer 36 on the first piece, as shown in Block 12 of FIG. 1. Irradiation may produce a heat affected zone in the alloy layer. In a preferred embodiment, a heat affected zone does not extend more than 20% of the depth of the surface alloy layer.

In a preferred embodiment, the invention further comprises directing a shielding gas at the region of the surface being irradiated as shown in Block 14 of FIG. 1. The shielding gas may be nitrogen or argon. The invention also comprises allowing the alloy layer to solidify, as shown in Block 16 of FIG. 1.

Figure 3:
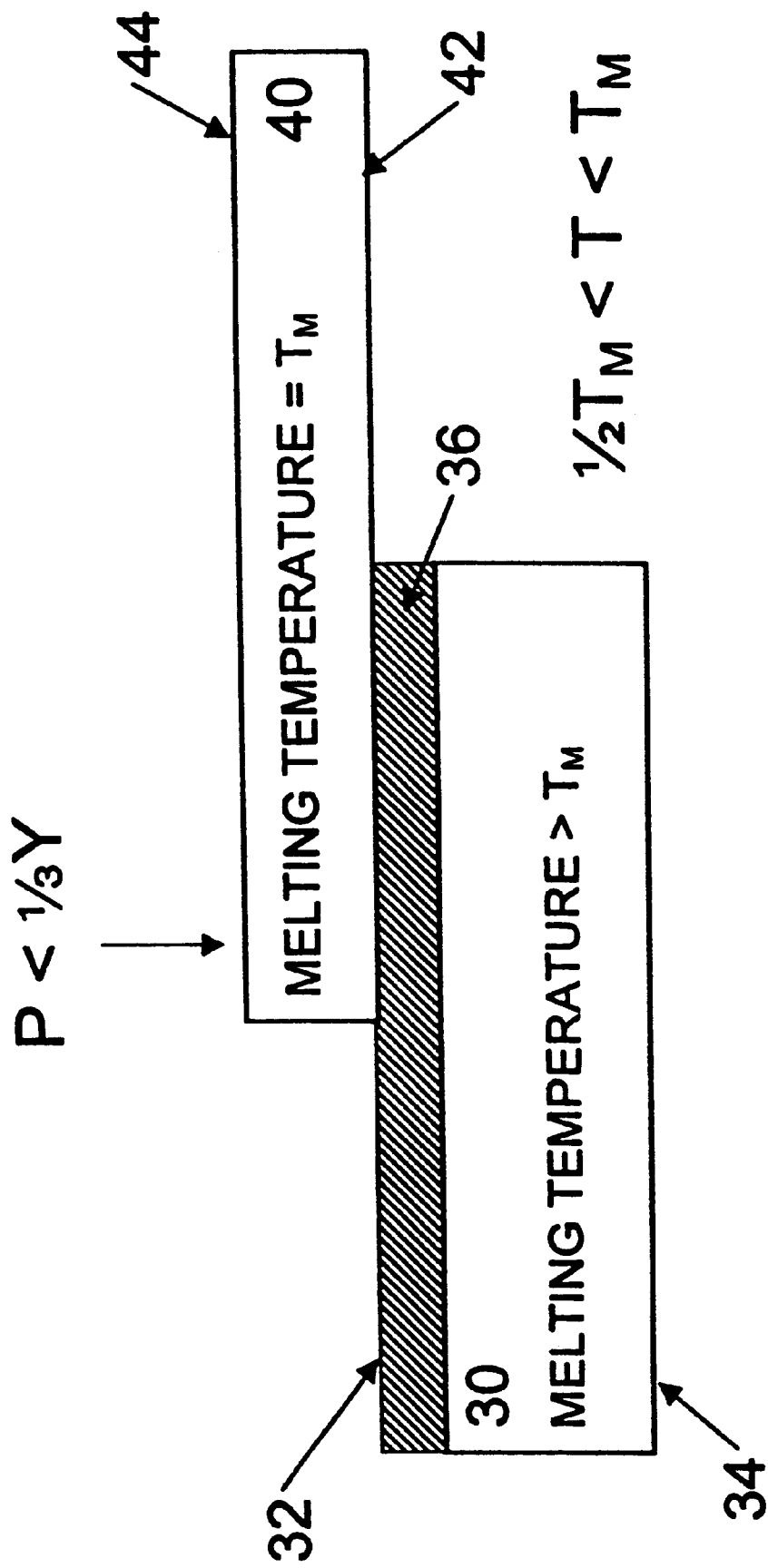
FIG. 3 is a side view of a first joining step embodiment of the present invention.

The invention further comprises joining a second metal or alloy piece 40 to the surface alloy layer of the first piece, wherein the second piece has a composition that is not identical to that of the first piece, as shown in Block 18 of FIG. 1. The second piece comprises a first surface 42, as shown in FIG. 3.

In one preferred embodiment, the joining is accomplished by welding or cladding the second piece to the alloy layer of the first piece, as shown in Block 58 of FIG. 5. In another preferred embodiment, the joining is accomplished by cladding the second piece to the alloy layer of the first piece, as shown in Block 58 of FIG. 5.

In another preferred embodiment, the joining is accomplished by diffusion bonding, the second piece to the alloy layer of the first piece as stated in Block 18 of FIG. 1. In this embodiment, the diffusion bonding is carried out at a temperature, T, such that ½ $T_M$<T<$T_M$, where $T_M$ is the melting temperature of the metal or alloy piece with the lower melting temperature, as shown in FIG. 3. The diffusion bonding is further carried out at a load pressure, P, that is less than one third of the yield strength at room temperature, Y, of the metal or alloy piece with the lower melting temperature.

Figure 4:
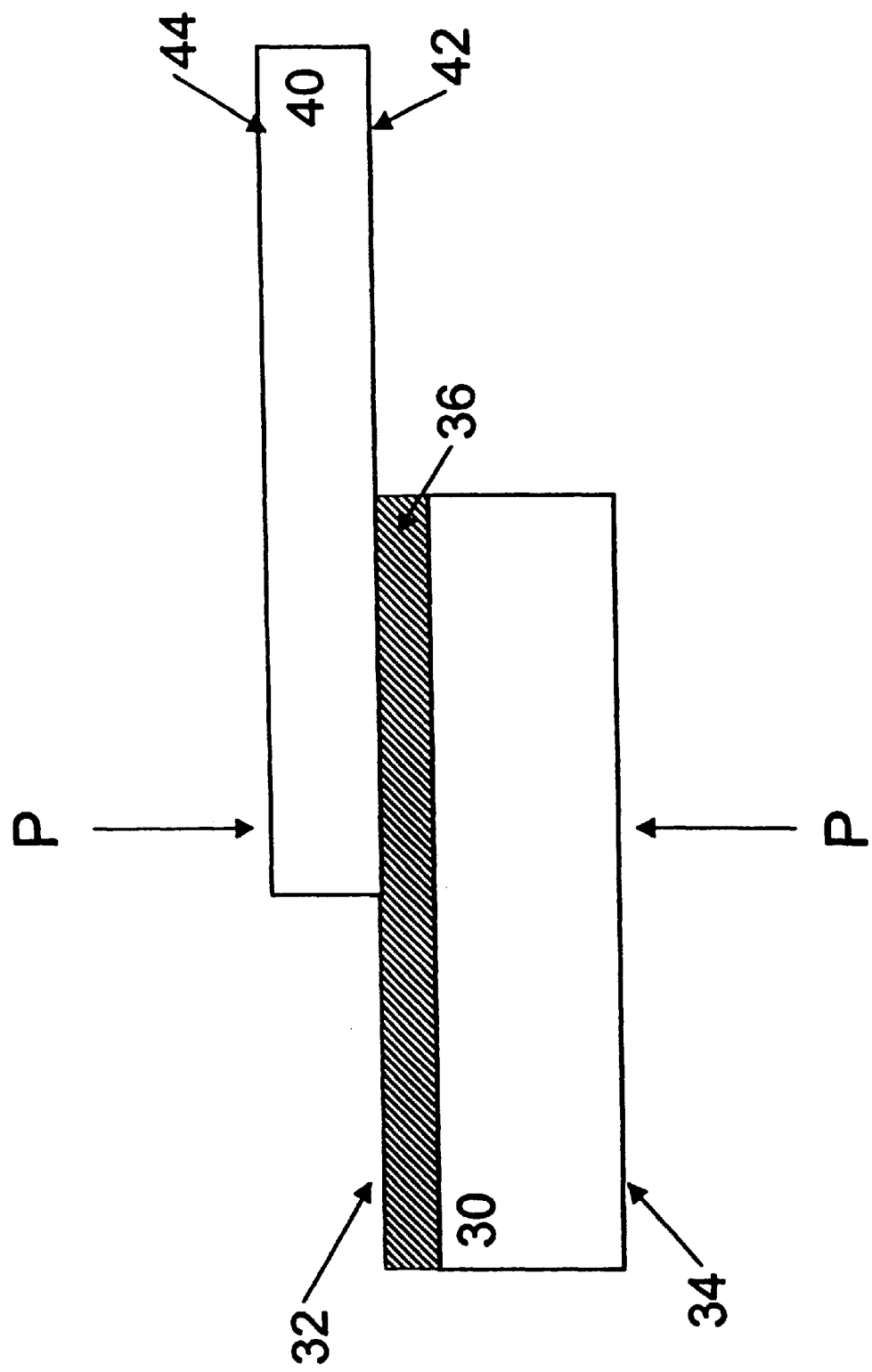
FIG. 4 is a side view of a second joining step embodiment of the present invention.

In another embodiment, the joining comprises placing the first surfaces of the first and second pieces against each other and pressing the first and second pieces together by applying a compressive force, P, against the second side of each piece as shown in FIG. 4. In the preferred embodiment showed in FIG. 4, the first and second pieces each have second surfaces 34, 44 opposite their first surfaces. This embodiment may be carried out under the temperature and load conditions as shown in FIG. 3.

A second method embodiment of the present invention is depicted in FIG. 2. This embodiment comprises coating a first surface of a first metal or alloy piece with a precursor layer comprising a binder and elemental/ceramic powder, as shown in Block 20 of FIG. 2. This embodiment further comprises irradiating the surface of the first piece with a laser beam at a sufficient energy and for a sufficient time to produce a surface alloy layer on the first piece, as shown in Block 21 of FIG. 2. The alloy layer is then allowed to solidify, as shown in Block 22 of FIG. 2.

The invention further comprises flattening the first surface of the first piece, as shown in Block 23 of FIG. 2. In a preferred embodiment, the flattening is accomplished by grinding, milling, machining, or hot pressing.

This embodiment further comprises flattening a first surface of a second metal or alloy piece, wherein the second piece has a composition that is not identical to that of the first piece, as shown in Block 24 of FIG. 2. The invention further comprises cleaning the first surfaces of the first and second pieces, as shown in Block 25 of FIG. 2. In a preferred embodiment, the cleaning is performed using alcohol.

The invention further comprises joining a second metal or alloy piece to the surface alloy layer of the first piece, as shown in Block 26 of FIG. 2. In a preferred embodiment, this joining may be accomplished by diffusion bonding, subject to the temperature and load pressure limitations, discussed above. In another preferred embodiment, the melting points of the first piece and second piece are greater than or equal to 231° C. In another preferred embodiment, the first piece comprises aluminum and the powder comprises chromium or nickel.

A third embodiment of the present invention is shown in FIG. 5. This embodiment comprises the same coating and irradiating steps as shown in FIG. 1. This embodiment of the invention further comprises allowing the alloy layer to solidify as shown in Block 54 of FIG. 5. This embodiment of the invention further comprises cleaning the first surface of a second piece, as shown in Block 56 of FIG. 5. This embodiment also comprises joining the first surface of the second metal or alloy piece to the surface alloy layer of the first piece, wherein the second piece has a composition that is not identical to that of the first piece. The joining is performed by welding or cladding, as shown in Block 58 of FIG. 5.

The foregoing disclosure and description of the invention are illustrative and explanatory. Various changes in the size, shape, and materials, as well as in the details of the illustrative construction may be made without departing from the spirit of the invention.

What is claimed is:

1. A method for joining two dissimilar metal or alloy pieces, comprising:
   a. coating a first surface of a first metal or alloy piece with a precursor layer comprising a binder and elemental/ceramic powder;
   b. irradiating the first surface of the first piece with a laser beam at a sufficient energy and for a sufficient time to produce a surface alloy layer on the said first piece;
   c. allowing the alloy layer to solidify; and
   d. joining a second metal or alloy piece to the surface alloy layer of the first piece, wherein the second piece has a composition that is not identical to that of the first piece.

2. The method of claim 1, wherein said joining is accomplished by welding the second piece to the alloy layer of the first piece.

3. The method of claim 1, wherein said joining is accomplished by diffusion bonding the second piece to the alloy layer of the first piece and wherein said bonding is carried out at a temperature, T, such that ½ $T_M$<T<$T_M$, where $T_M$ is the melting temperature of the metal or alloy piece with the lower melting temperature, and wherein said bonding is further carried out at a load pressure that is less than one third of the yield strength at room temperature of the metal or alloy piece with the lower melting temperature.

4. The method of claim 1, wherein said joining is accomplished by cladding the second piece to the alloy layer of the first piece.

5. The method of claim 1, wherein said first and second pieces each have second surfaces opposite their first surfaces.

6. The method of claim 1, wherein said joining comprises:
   a. placing the first surfaces of said first and second pieces against each other; and
   b. pressing the first and second pieces together by applying a compressive force that is less than one third of the yield strength at room temperature of the metal or alloy piece with the lower melting temperature at a temperature T, such that ½ $T_M$<T<$T_M$, where $T_M$ is the melting temperature of the metal or alloy piece with the lower melting temperature.

7. The method of claim 1, wherein the first piece comprises steel and the precursor comprises chromium.

8. The method of claim 7, wherein the second piece comprises aluminum and said joining is accomplished by diffusion bonding.

9. The method of claim 1, wherein the first piece comprises steel and the precursor comprises copper.

10. The method of claim 9, wherein the second piece comprises nickel and said joining is accomplished by cladding.

11. The method of claim 9, wherein the second piece comprises copper said joining is accomplished by cladding.

12. The method of claim 1, wherein the first piece comprises titanium-6 aluminum-4 vanadium and said precursor comprises chromium.

13. The method of claim 1 further comprising directing a shielding gas at the region of the surface being irradiated.

14. The method of claim 1 wherein the first piece comprises steel or aluminum or an aluminum alloy and the precursor comprises chromium or nickel.

15. A method for joining two dissimilar metal or alloy pieces, comprising:
   a. coating a first surface of a first metal or alloy piece with a precursor layer comprising a binder and elemental/ceramic powder;
   b. irradiating the first surface of the first piece with a laser beam at a sufficient energy and for a sufficient time to produce a surface alloy layer on the said first piece;
   c. allowing the alloy layer to solidify;
   d. flattening the first surface of said first piece;
   e. flattening a first surface of a second metal or alloy piece wherein the second piece has a composition that is not identical to that of the first piece;
   f. cleaning the first surface of said first piece and the first surface of a second piece; and
   g. joining a second metal or alloy piece to the surface alloy layer of the first piece.

16. The method of claim 15 wherein said flattening is accomplished by grinding, milling, machining, or hot pressing.

17. The method of claim 15, wherein the melting points of said first piece and said second piece are greater than or equal to 231° C.

18. The method of claim 15 wherein said joining is accomplished by diffusion bonding the first surfaces of said first and second pieces together and wherein said bonding is carried out at a temperature, T, such that ½ $T_M$<T<$T_M$, where $T_M$ is the melting temperature of the metal or alloy piece with the lower melting temperature, and wherein said bonding is further carried out at a load pressure that is less that one third of the yield strength at room temperature of the metal or alloy piece with the lower melting temperature.

19. The method of claim 18 wherein the elemental/ceramic powder has a yield strength that is greater than one third of the yield strength of the metal or alloy piece with the lower melting temperature.

20. The method of claim 18 wherein the first piece comprises steel or aluminum and said powder comprises chromium or nickel.

21. The method of claim 15 wherein said cleaning is performed using alcohol.

22. A method for joining two dissimilar metal or alloy pieces, comprising:
   a. coating a first surface of a first metal or alloy piece with a precursor layer comprising a binder and elemental/ceramic powder;
   b. irradiating the first surface of the first piece with a laser beam at a sufficient energy and for a sufficient time to produce a surface alloy layer on the said first piece;
   c. allowing the alloy layer to solidify;
   d. cleaning the first surface of said first piece and the first surface of a second piece; and
   e. joining the first surface of the second metal or alloy piece to the surface alloy layer of the first piece, wherein the second piece has a composition that is not identical to that of the first piece, said joining performed by welding or cladding.

* * * * *